United States Patent
Landry

[19]

[11] Patent Number: 5,996,704
[45] Date of Patent: Dec. 7, 1999

[54] HIGH ROW CANE CULTIVATOR

[76] Inventor: Paul J. Landry, 5516 Old Jeanerette, Rd., New Iberia, La. 70560

[21] Appl. No.: 08/947,890

[22] Filed: Oct. 9, 1997

[51] Int. Cl.$^6$ .................................................. A01B 63/14
[52] U.S. Cl. .......................... 172/318; 172/314; 172/395; 172/455; 172/776; 111/925
[58] Field of Search ..................................... 172/455, 452, 172/78, 238, 244, 259, 260, 274, 314, 318, 327, 328, 394, 395, 397, 776, 454; 111/923, 924, 925; 280/839, 482, 491.2

[56] References Cited

U.S. PATENT DOCUMENTS

| | | |
|---|---|---|
| 2,874,490 | 2/1959 | Harmon ............................... 172/397 X |
| 3,106,968 | 10/1963 | Talbert ................................... 172/395 |
| 3,672,701 | 6/1972 | Blank . |
| 4,036,304 | 7/1977 | Crow, Jr. . |
| 4,108,089 | 8/1978 | Van Der Lely ....................... 172/78 X |
| 4,211,288 | 7/1980 | Applequist . |
| 4,247,126 | 1/1981 | Claxton ............................... 172/395 X |
| 4,374,546 | 2/1983 | Mitchell ................................. 172/148 |
| 4,637,474 | 1/1987 | Leonard . |
| 4,703,810 | 11/1987 | Meiners ................................. 172/178 |
| 5,346,019 | 9/1994 | Kinzenbaw et al. . |
| 5,477,930 | 12/1995 | Degelman et al. . |
| 5,524,712 | 6/1996 | Balmer . |
| 5,535,832 | 7/1996 | Benoit . |
| 5,628,371 | 5/1997 | Behrens ................................. 172/395 |

*Primary Examiner*—Victor Batson
*Attorney, Agent, or Firm*—Robert N. Montgomery

[57] ABSTRACT

A towed, three row cultivator including a frame, a hitch bar, primary and secondary implement bars and vertical columns slidable within bearing housings attached at each side of the frame. The columns are attached to each other at the upper end by a bridge member and terminate in wheel assembles at the lower end. Actuators are provided for lifting and lowering the frame relative to the columns. Fertilizer and chemical tanks may also be provided for attachment to the bridge member, thereby placing the weight of such tanks and their contents directly on the wheels independent of the frame.

15 Claims, 5 Drawing Sheets

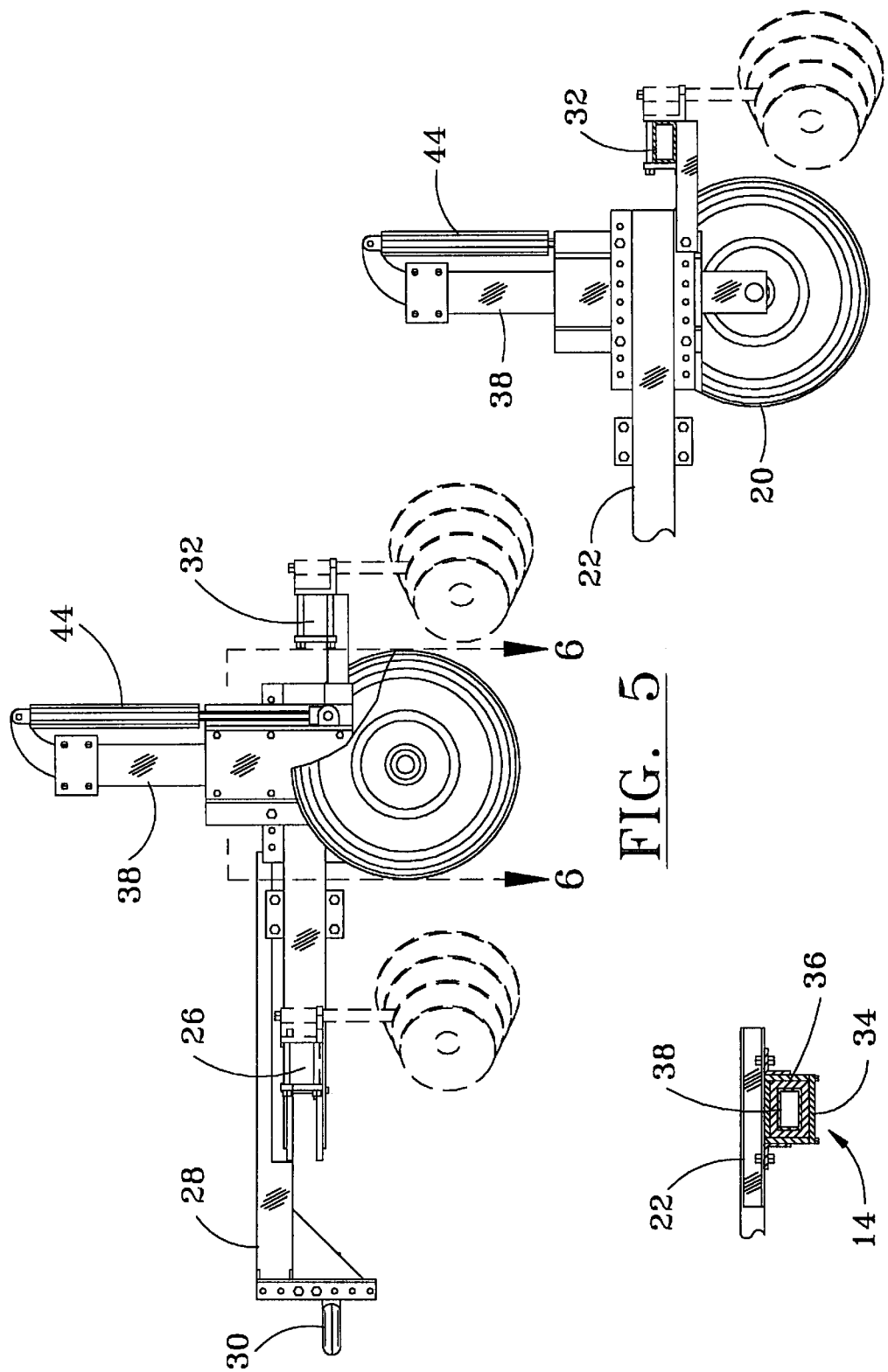

HIGH ROW CANE CULTIVATOR

BACKGROUND OF THE INVENTION

1. Field of the Invention

This invention relates generally to agricultural cultivators and more particularly to multiple row, vehicle drawn cultivators used in the cultivation, fertilization and chemical application of sugar cane.

2. General Background

In most cases a three rows cultivator is simply towed behind a tractor while being raised and lowered by the tractor's hydraulic draw bar. However, this puts an enormous strain on the tractor's draw bar and limits the type and number of implements being towed. Vehicle drawn cultivators are widely used and well known within the art, especially for multiple row cultivators. Such apparatus generally includes an implement frame structure having several wheels and an attachment means or hitch for securing the implement frame structure to a motor vehicle such as a tractor. The apparatus also generally includes a method for raising and lowering the implements relative to the ground to control the amount of penetration of the ground by the implement and to hold the implement above ground level when necessary. This arrangement allows the weight of the frame and implements to be carried by the cultivator wheels rather than by the hydraulic draw bar of the tractor. Examples of the prior art are disclosed in the following patents; Pat. Nos. 3,672,701, 4,036,304, 4,211,288, 4,637,474, 5,346,019, 5,477,930, 5,524,712, and 5,535,832. As can be seen in these disclosures, almost without exception, the cultivators rely on plural wheels to support the implement frame and implements. They all provide some means for caming the wheels, thereby lifting the frame and its implements. These apparatus are generally implement dependent, therefore, generally configured for a specific type of implement rather than utilizing a common implement bar for attaching and positioning any type of implement. Although this arrangement has received wide acceptance in most agricultural applications, there are several disadvantages which are amplified due to special requirements of sugar cane farming. For example, sugar cane requires very high rows and deep furrows, thereby limiting the width of the wheels allowable in a single furrow and requiring high ground clearance. Further, large chemical tanks are normally carried on the tractor, due to their great weight, thereby hindering the visibility of the tractor driver, increasing ground penetration by the front steering wheels and hindering air circulation to the tractor's engine.

Therefore, it would be advantageous for the cane farmer to have a cultivator which utilizes a frame structure having no central axle, thereby allowing for deep furrows, only two wheels for straddling the row, a method for carrying large chemical tanks, and a method for raising and lowering the implement frame without lifting the chemical tanks.

SUMMARY OF THE INVENTION

The present invention discloses a cultivator having a main carrier frame with ground support wheels. The carrier frame is pivotally attached to a tractor by an adjustable hitch. The main carrier frame is fitted with a first adjustable implement or tool bar, capable of extending across the row on either side of the carrier frame, positioned adjacent the front of the frame perpendicular to the hitch and a second tool bar located along the rear of the carrier frame approximately the width of the cultivator. A vertical lifting mechanism is provided at each side of the carrier frame for raising and lowering the carrier frame relative to the ground. Each of the lifting mechanisms includes sliding columns connected at one end by a bridge member and terminating at the opposite end in a wheel assembly.

Saddles may be provided and attached to each end of the bridge member for supporting large chemical tanks or other heavy loads, thereby transferring the weight of such loads directly to the wheels and not to the carrier frame. The wheels are fitted with heavy duty, large radius, high flotation tires to insure sufficient ground clearance over the high rows required by sugar cane. Since no axle is require in this arrangement, the carrier frame can be lifted to a height which will clear a standing crop of young sugar cane, thereby allowing the cultivator to be used strictly for spraying chemicals.

BRIEF DESCRIPTION OF THE DRAWINGS

For a further understanding of the nature and objects of the present invention, reference should be made to the following detailed description taken in conjunction with the accompanying drawings, in which like parts are given like reference numerals, and wherein:

FIG. 5 is vertical right side view of the cultivator;

FIG. 6 is a partial cross section taken along sight lines 6—6 in FIG. 5; and

FIG. 7 is a vertical elevation view taken along sight lines 7—7 in FIG. 3.

DETAILED DESCRIPTION OF THE PREFERRED EMBODIMENT

Figure 1:
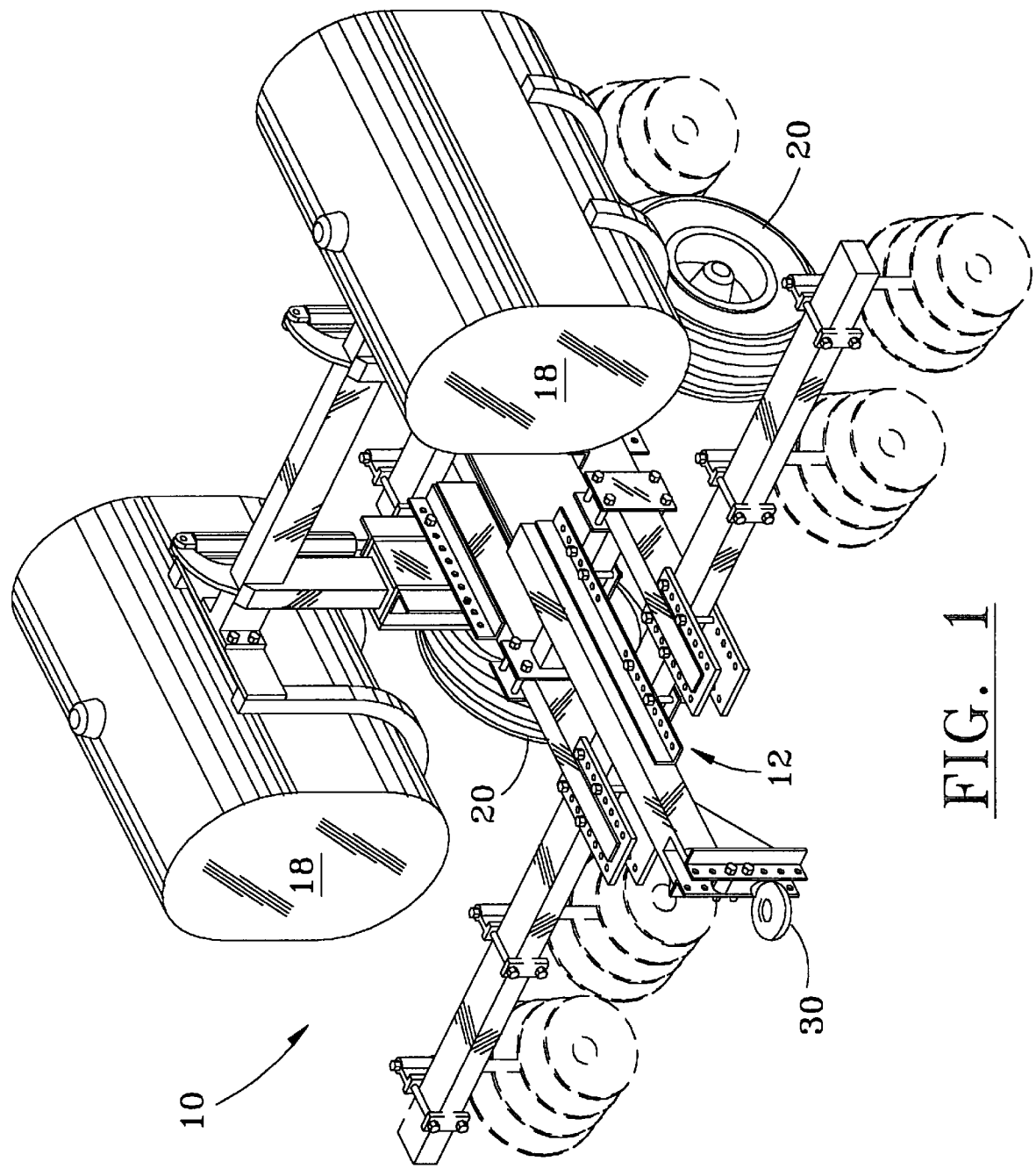
FIG. 1 is a isometric assembly view of the cultivator.

The cultivator 10 illustrated in FIG. 1 is a towable, three row cultivator for use by farmers in the cultivation, fertilization and chemical treatment of row crops and sugarcane in particular. The cultivator 10 includes a carrier frame assembly 12, a pair of lifting mechanisms 14 and a pair of support frame members 16 seen in FIG. 2, a pair of chemical tanks 18 and a set of heavy duty, large radius, high flotation wheels 20. The carrier frame 12 includes a pair of side rail members 22 best seen in FIG. 3. The two side rails 22 are held in spaced apart relationship by a movable cross member 24. Each rail member 22 is notched at one end for accepting a primary tool or implement bar 26 which extends perpendicular to and between the two side members 22 and for some distance beyond on either side. The tool bar 26 is slidable relative to the side member thereby allowing the tool bar to be infinitely positioned relative to the carrier frame 12, and may be adjusted diagonally. A hitch member 28 is removably attached to the cross member 24 and the primary tool bar 26 is linearly adjustable and fitted with a vertically adjustable connecting eye 30. A secondary tool or implement bar 32 parallel to the primary tool bar 26 is removably connected to the rear of the side members 22 and may be made pivotal.

Figure 2:
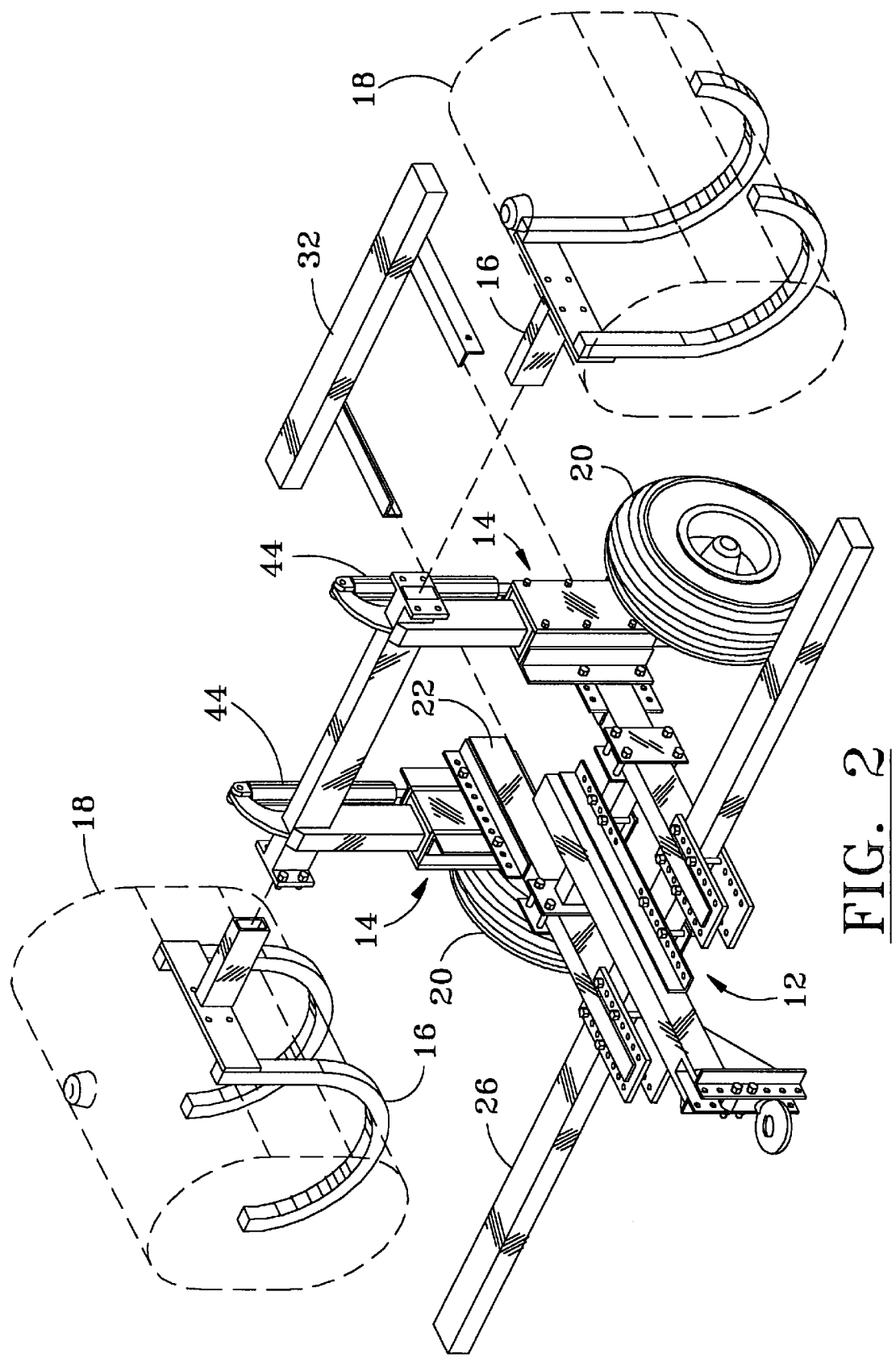
FIG. 2 is a partial exploded view of the isometric assembly shown in FIG. 1.
Figure 3:
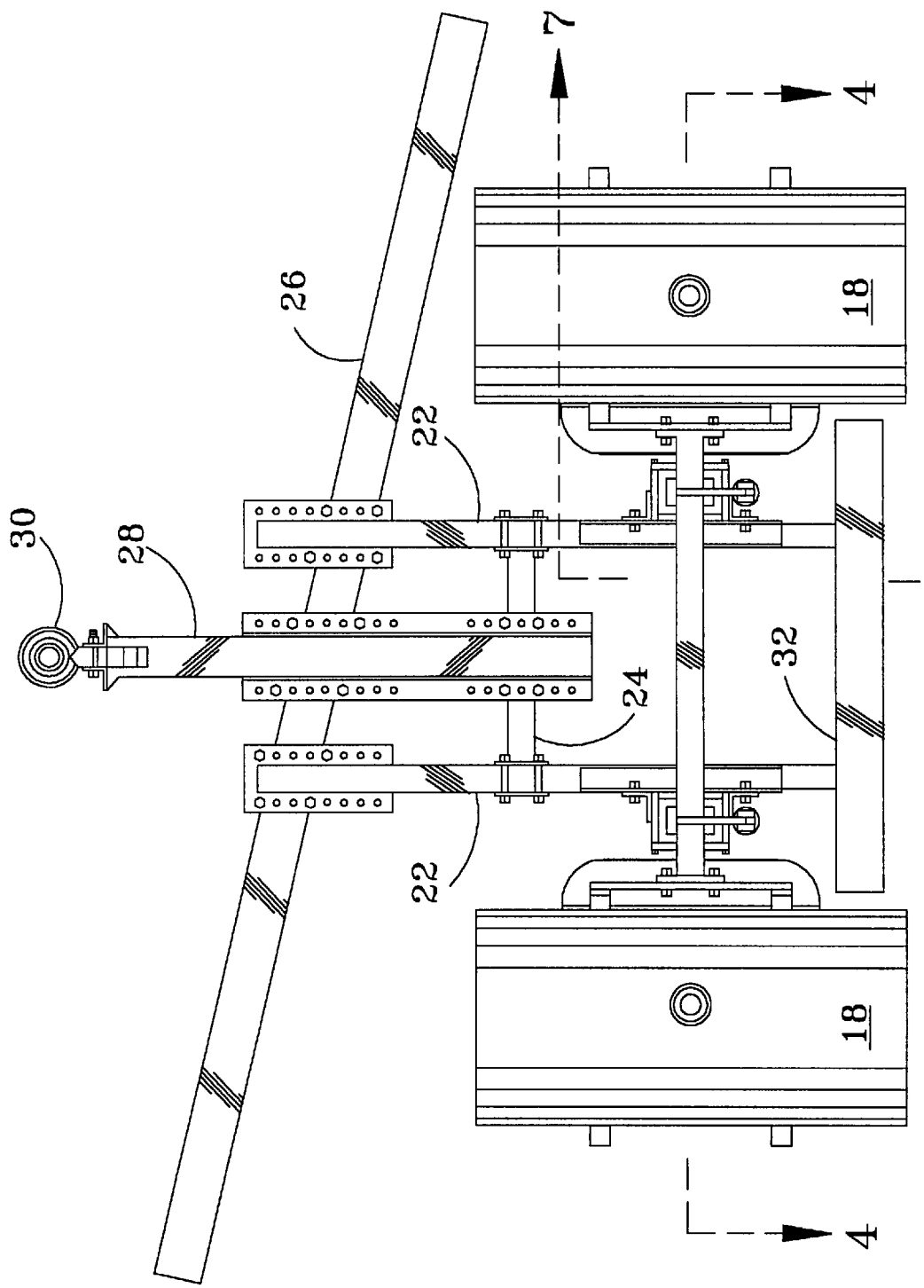
FIG. 3 is a top view of the assembly shown in FIG. 1.
Figure 4:
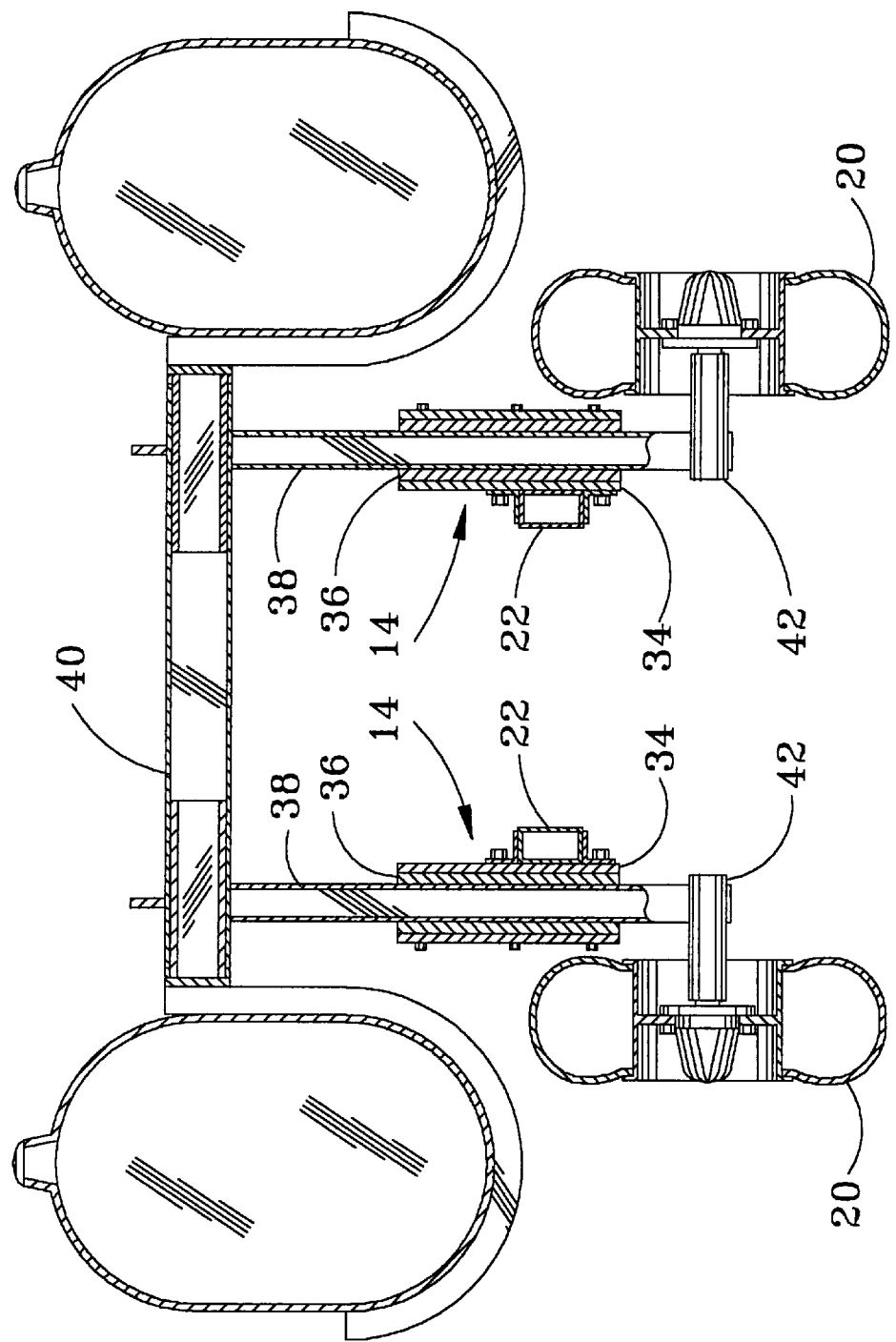
FIG. 4 is a cross section view taken along sight lines 4—4 in FIG. 3.

The lifting mechanism 14 shown in cross-section in FIGS. 4–7 includes a sleeve housing 34, including liner bearings 36, linearly adjustable and removably attached to the side members 22. Vertical columns 38 are provided which are slidable within the linear bearings 36. A bridge member 40 connects each of the vertical tubular columns 38 at one end with the vertical tubular columns 38 terminating in wheel hub assemblies at their opposite end. A hydraulic liner actuator 44, seen in FIGS. 5 and 7, is attached at each end of the bridge member 40 and to the sleeve housings 34 for lifting and lowering the carrier frame 12 relative to the vertical tubular columns 38. Support members 16 labeled in FIG. 2 are provided and may be removably attached at each end of the bridge member 40. Although the support members 16 shown in FIGS. 1–4 are configured for tanks, such supports may be configured for other loads.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A towed, three-row cultivator comprising:
   a) a towable frame having side members, primary and secondary tool bars and a hitch member;
   b) a bearing housing attached to each said side member;
   c) a tubular column slidable within each said bearing housing, each said column being connected, to a bridge member;
   d) a wheel assembly attached to each said tubular column opposite said bridge member; and
   e) a means for positioning each of said bearing housing and said frame, relative to said tubular column and said bridge member.

2. A towed, three-row cultivator according to claim 1 wherein said primary tool bar spans at least three rows of crops and is linearly and diagonally adjustable relative to said frame.

3. A towed, three-row cultivator according to claim 1 wherein said cultivator further comprises support members attached to said bridge member.

4. A towed, three-row cultivator according to claim 3 wherein said support members are configured to receive chemical tanks.

5. A towed, three-row cultivator according to claim 1 wherein said means for positioning is a hydraulic actuator.

6. A towed cultivator comprising:
   a) a carrier frame having side members held generally parallel by a detachable spacer member;
   b) a primary and secondary tool bar attached to said carrier frame;
   c) a hitch member attached to said primary tool bar and said spacer member;
   d) a first bearing housing attached to one of said side members;
   e) a second bearing housing attached to one of said side members opposite said first bearing housing;
   f) a tubular column slidably located within each said first and second bearing housing;
   g) a bridge member connecting to an end of each said tubular column and a wheel assembly attached to each said tubular column at an end opposite said bridge member; and
   h) a means for raising and lowering said carrier frame and said first and second bearing housing relative to said bridge member.

7. A towed cultivator according to claim 6 wherein said cultivator further comprises support means attached to said bridge member for securing fertilizer and chemical tanks.

8. A towed cultivator according to claim 6 wherein said primary tool bar spans three rows of crops and is linearly and diagonally positionable relative to said frame.

9. A towed cultivator according to claim 6 wherein said means for raising and lowering said carrier frame is a hydraulic actuator.

10. A towed cultivator according to claim 6 wherein said secondary tool bar spans a single row of crops and is attached to said carrier frame opposite said primary tool bar.

11. A towed cultivator according to claim 6 wherein said secondary tool bar is pivotal.

12. A method of transporting fertilizer and chemical tanks on board a towed three-row cultivator whereby said tanks are elevated above standing high row crops and their weight is independent of said cultivator comprising the steps of:
   a) providing a towed three row cultivator comprising:
      i) a frame having side members, primary and secondary tool bars and a hitch member;
      ii) a vertical bearing housing attached to each said side member;
      iii) a tubular column slidable within each said bearing housing, each said column being connected, at one end, to a bridge member;
      iv) a wheel assembly attached to each said tubular column opposite said bridge member; and
      v) a means for positioning each of said bearing housing and said frame, relative to said tubular column and said bridge member;
   b) attaching a plurality of agricultural implements to said tool bars;
   c) connecting said hitch member to a vehicle for towing;
   d) raising and lowering said frame and tool bars via said means for positioning; attaching said fertilizer and chemical tanks to said bridge member; and
   e) transporting the towed three-row cultivator.

13. The method according to claim 12 includes the step of transferring the weight of said tanks to said wheel assembly independent of said frame.

14. The method according to claim 12 includes the step of adjustably positioning said bearing housings relative to said frame.

15. The method according to claim 12 includes the step of positioning said primary tool bar relative to the frame both linearly and angularity.

* * * * *